US008285660B2

(12) United States Patent
Coldicott et al.

(10) Patent No.: US 8,285,660 B2
(45) Date of Patent: Oct. 9, 2012

(54) SEMI-AUTOMATIC EVALUATION AND PRIORITIZATION OF ARCHITECTURAL ALTERNATIVES FOR DATA INTEGRATION

(75) Inventors: Peter Alan Coldicott, Leander, TX (US); Guenter Anton Sauter, Ridgefield, CT (US); Mei Yang Selvage, Pocatello, ID (US); Olaf W Zimmermann, Zürich (CH)

(73) Assignee: International Business Machines Corporation, Armonk, NY (US)

( * ) Notice: Subject to any disclaimer, the term of this patent is extended or adjusted under 35 U.S.C. 154(b) by 652 days.

(21) Appl. No.: 12/479,271

(22) Filed: Jun. 5, 2009

(65) Prior Publication Data

US 2010/0312737 A1     Dec. 9, 2010

(51) Int. Cl.
G06F 7/00 (2006.01)
G06F 17/00 (2006.01)
G06F 15/177 (2006.01)
(52) U.S. Cl. .......... 706/45; 709/220; 709/223; 707/600; 707/790
(58) Field of Classification Search .................. None
See application file for complete search history.

(56) References Cited

U.S. PATENT DOCUMENTS

| 5,784,539 | A | 7/1998 | Lenz |
| 7,328,157 | B1 | 2/2008 | Chu et al. |
| 7,437,341 | B2 | 10/2008 | Morgan |
| 2006/0010195 | A1 | 1/2006 | Mamou et al. |
| 2006/0149574 | A1 | 7/2006 | Bradley et al. |
| 2008/0301076 | A1 * | 12/2008 | Timmins et al. ................ 706/46 |
| 2009/0240516 | A1 * | 9/2009 | Palestrant .......................... 705/1 |

OTHER PUBLICATIONS

Zimmermann et al., "Combining Pattern Languages and Reusable Architectural Decision Models into a Comprehensive and Comprehensible Design Method", 2008. WICSA 2008, Seventh Working IEEE/IFIP Conference on Software Architecture,Volume , Issue , Feb. 18-21, 2008 pp. 157-166.
Zimmermann et al. "Reusable Architectural Decision Models for Enterprise Application Development", Software Architectures, Components and Applications, Springer Berlin/Heidelberg, vol. 4880/2008, pp. 15-32.
MacLean et al., "Questions, Options, and Criteria: Elements of Design Space Analysis", Human-Computer Interaction, 1991, vol. 6, pp. 201-250.
Svahnberg et al., "A Quality-Driven Decision-Support Method for Identifying Software Architecture Candidates", International Journal of Software Engineering and Knowledge Engineering, vol. 13, No. 5, 2003, pp. 547-573.

(Continued)

*Primary Examiner* — Alan Chen
(74) *Attorney, Agent, or Firm* — Yee & Associates, P.C.; Mark C. Vallone (57) ABSTRACT

Evaluating and prioritizing architectural design pattern alternatives for data integration is provided. A set of decision factors is derived from requirements for a system to be integrated. A default score is assigned to each decision factor based on historical data integration knowledge, and the default scores are weighted. A priority score is also assigned to each decision factor based on collected inputs from system metadata and subject matter experts in the enterprise system. Next, an individual consolidated score for each decision factor is calculated using the default score, the weighted score, and the priority score, and a total consolidated score is calculated from the individual consolidated scores for the architecture design pattern. The total consolidated score for the architecture design pattern may be compared against total consolidated scores for other architecture design patterns to determine a suitable candidate architecture design pattern for data integration.

20 Claims, 7 Drawing Sheets

OTHER PUBLICATIONS

Wojcik et al., "Attribute-Driven Design (ADD), Version 2.0", Software Engineering Institute, Nov. 2006, Technical Report CMU/SEI-2006-TR-023, ESC-TR-023, pp. 1-41.

"IBM Unified Method Framework", pp. 1-2, retrieved Dec. 23, 2008 http://method.endicott.ibm.com/MethodWebUMF/index.htm.

Roggio, "A Model for the Software Engineering Capstone Sequence Using the Rational Unified Process", ACM Digital Library SE'06, Mar. 10-12, 2006, Melbourne, Florida, USA, pp. 306-311.

Cunningham "About the Portland Form," [retrieved from Internet on Mar. 23, 2012], published in 2002, http://c2.com/ppr/about/portland.html, 2 pages.

Jansen et al., "Software Architecture as a Set of Architectural Design Decisions," WICSA '05 Proceedings of the 5th Working IEEE/IFIP Conference on Software Architecture, IEEE Computer Society, Pittsburgh, Pennsylvania, Nov. 6-10, 2005, 10 pages.

Kruchten, "An Ontology of Architectural Design Decisions in Software-Intensive Systems," 2nd Groningen Workshop Software Variability, Oct. 14, 2004, pp. 54-61.

Lee et al., "What's in Design Rationale?," Human-Computer Interaction, Sep. 1991, vol. 6, pp. 251-280.

Sauter et al., "Information Service Patterns, Part 1: Data Federation Pattern," http://www.ibm.com/developerworks/webservices/library/ws-soa-infoserv1/, Jul. 28, 2006, 12 pages.

Sauter et al., "Information Service Patterns, Part 2: Data Consolidation Pattern," http://www.ibm.com/developerworks/webservices/library/ws-soa-infoserv2/, Dec. 5, 2006, 12 pages.

Tyree et al., "Architecture Decisions: Demystifying Architecture," IEEE Software, 22(2):19-27, Mar./Apr. 2005.

Zimmermann et al., "The Role of Architectural Decisions in Model-Driven SOA Construction," Proceedings of International Conference on Object-Oriented Programming, Systems, Languages, and Applications, Best Practices and Methodologies in Service-Oriented Architectures, Portland, Oregon, ACM, Oct. 22-26, 2006, 7 pages.

* cited by examiner

| EVALUATION FACTOR | DEFAULT SCORE | WEIGHT |
|---|---|---|
| DATA LATENCY | 10 | 20.83 |
| AVAILABLITY OF THE TARGET SYSTEM | 10 | 20.83 |
| DATA QUALITY- TRANSFORMATION | 1 | 2.08 |
| PERFORMANCE- RESPONSE TIME | 7 | 14.58 |
| PERFORMANCE- SCALABILITY | 8 | 16.67 |
| CUD PROFILE | 1 | 2.08 |
| IMPACT OF WORKLOAD TO SOURCES | 1 | 2.08 |
| FLEXIBILITY | 10 | 20.83 |

FIG. 6

|  | DATA FEDERATION | DATA CONSOLIDATION | APPLICATION-BASED INTEGRATION |
|---|---|---|---|
| DATA LATENCY | 10 | 1 | 10 |
| AVAILABLITY OF THE TARGET SYSTEM | 3 | 8 | 5 |
| DATA QUALITY- TRANSFORMATION | 8 | 10 | 8 |
| PERFORMANCE- RESPONSE TIME | 4 | 4.5 | 3.5 |
| PERFORMANCE- SCALABILITY | 4 | 5 | 4 |
| CUD PROFILE | 1 | 1 | 1 |
| IMPACT OF WORKLOAD TO SOURCES | 7 | 3 | 9 |
| AMOUNT OF INTEGRATED DATA (FOR LARGE DATA) | 6 | 8 | 5 |

PRIORITY SCORES

| | PATTERN 708 | | | | | | |
|---|---|---|---|---|---|---|---|
| | FEDERATION | | CONSOLIDATION/ POPULATION | APPLICATION-BASED | DEFAULT ANSWER SCORE | NFR WEIGHT | ANSWERS+ WEIGHT/10 |
| | STANDARD PATTERN | WITH CACHING | STANDARD PATTERN | STANDARD PATTERN | | | |
| PRIMARY DECISION FACTORS 716 | 704 720 | 704 720 | 704 720 | 704 720 | 710 | 712 | 714 |
| DATA LATENCY | 10  13.08 | 7  10.08 | 1  4.08 | 10  13.08 | 10 | 20.83 | 3.08 |
| DATA QUALITY-TRANSFORMATION | 8  8.31 | 8  8.31 | 10  10.31 | 8  8.31 | 1 | 2.08 | .31 |
| PERFORMANCE-RESPONSE TIME | 4  6.16 | 4.5  6.66 | 4.5  6.66 | 3.5  5.66 | 7 | 14.58 | 2.16 |
| PERFORMANCE-SCALABILITY | 4.5  6.97 | 5  7.47 | 4.5  6.97 | 4.5  6.97 | 8 | 16.67 | 2.47 |
| CUD PROFILE | 1  1.31 | 1  1.31 | 1  1.31 | 1  1.31 | 1 | 2.08 | .31 |
| SUB SUM | 28  35.83 | 26  33.83 | 21  29.33 | 27  35.33 | | | |
| SECONDARY DECISION FACTORS | | | | | | | |
| AVAILABLITY OF THE TARGET SYSTEM | 3  6.08 | 4  7.08 | 8  11.08 | 5  8.08 | 10 | 20.83 | 3.08 |
| FLEXIBILITY | 7  10.08 | 7  10.08 | 3  6.08 | 9  12.08 | 10 | 20.83 | 3.08 |
| IMPACT OF WORKLOAD TO SOURCES | 6  6.31 | 7  7.31 | 5  5.31 | 5  5.31 | 1 | 2.08 | .31 |
| AMOUNT OF DATA INVOLVED IN INTEGRATION | 0  0.00 | 0  0.00 | 0  0.00 | 0  0.00 | 0 | 0.00 | 0.0 |
| OTHER FACTOR B | 0  0.00 | 0  0.00 | 0  0.00 | 0  0.00 | 0 | 0.00 | 0.0 |
| SUM | 44  58.30 | 44  58.30 | 37  51.80 | 46  60.80 | | 100.00 | |

FIG. 8

SEMI-AUTOMATIC EVALUATION AND PRIORITIZATION OF ARCHITECTURAL ALTERNATIVES FOR DATA INTEGRATION

BACKGROUND

1. Field

The disclosure relates generally to an improved data processing system, and more specifically to providing semi-automatic evaluation and prioritization of architectural alternatives for data integration, a.k.a. information integration.

2. Description of the Related Art

Data within large organizations is often contained in heterogeneous databases that have different structures for representing the same or overlapping data. The heterogeneity can occur on various levels: technologies (e.g., hierarchical, network, relational, XML, etc.), data models (normalized, non-normalized, etc.), instance values, etc. Data structure heterogeneity becomes a challenge when data from the multiple sources needs to be integrated. Data integration or information integration enables end users to access connected data in multiple databases transparently, so that the end users are not limited by system boundaries.

There are three primary data integration architecture patterns that are used to address the heterogeneous database data integration challenge: data federation, data consolidation, and application-based integration. The data federation architecture pattern provides a virtual data integration approach in that the data is aggregated "on the fly" and only when requested by the consumer. The data consolidation architecture pattern extracts the data from its sources, transforms (integrates) the data, and then loads (copies) the data into a target database before a consumer requests the data. The application-based integration architecture pattern uses application programming interfaces (APIs) to integrate data from various systems and facilitate process choreography. Application-based integration is often implemented using a variety of middleware technologies and programming models. Enterprise Service Bus (ESB), the backbone of Service Oriented Architecture (SOA), is a type of application-based integration architecture. Although the objective of these three data integration architecture patterns is the same—they all integrate data—the characteristics of each pattern are different.

When solution architects want to design a solution that integrates data from multiple heterogeneous sources, they must decide which data integration architecture pattern to apply. The pattern selection is a complex process, as the solution architects must consider numerous data integration and design factors to determine the most appropriate pattern for a given scenario. Failure to select an appropriate data integration architecture pattern can result in delayed project deliverables, significantly increased costs, and even failure of the overall project.

SUMMARY

The illustrative embodiments provide a systematic approach to evaluating and prioritizing architectural alternatives for data integration. A set of decision factors is derived from a set of requirements for a system to be integrated. The set of requirements specify capabilities an architecture design pattern is required to provide. A default score is assigned to each decision factor in the set of decision factors based on historical data integration knowledge, and a weighted score is calculated for each decision factor using the default scores to indicate a priority of a decision factor in relation to other decision factors. A priority score is also assigned to each decision factor based on inputs obtained from system metadata related to the decision factors from virtual and physical data sources, experts in the enterprise system, and expert data related to the decision factors from subject matter experts in the enterprise system. Next, an individual consolidated score is calculated using the default score, weighted score, and the priority score of each decision factor, and a total consolidated score is calculated from the individual consolidated scores for the architecture design pattern. The total consolidated score for the architecture design pattern may be compared against total consolidated scores for other architecture design patterns to determine a suitable candidate architecture design pattern for data integration.

DETAILED DESCRIPTION

As will be appreciated by one skilled in the art, the embodiments of the disclosure may be embodied as a system, method or computer program product. Accordingly, the embodiments of the disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the embodiments of the disclosure may take the form of a computer program product embodied in any tangible medium of expression having computer usable program code embodied in the medium.

Any combination of one or more computer usable or computer readable data storage medium(s) may be utilized. The computer-usable or computer-readable data storage medium may be, for example but not limited to, an electronic, magnetic, optical, or semiconductor system, apparatus, or device. More specific examples (a non-exhaustive list) of the computer-readable data storage medium would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, or an intranet, or a magnetic storage device. In the context of this document, a computer-usable or computer-readable data storage medium may be any medium that can store the program for use by or in connection with the instruction execution system, apparatus, or device. The computer usable program code may be transmitted using any appropriate medium, including but not limited to wireless, wireline, optical fiber cable, RF, etc.

Computer program code for carrying out operations of the embodiments of the disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The embodiments of the disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
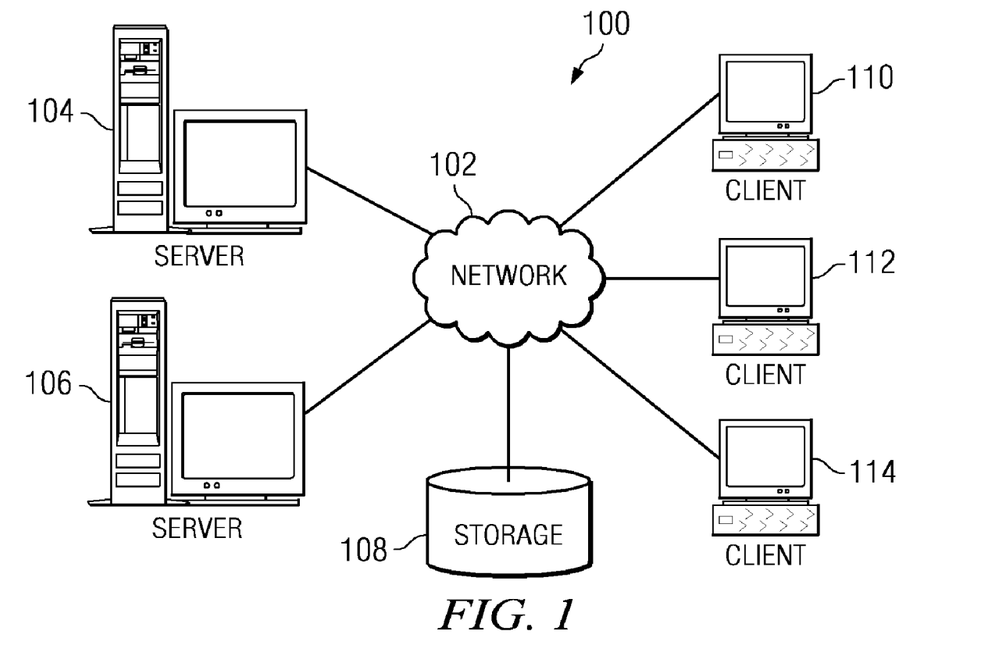
FIG. 1 depicts a pictorial representation of a distributed data processing system in which the illustrative embodiments may be implemented.
Figure 2:
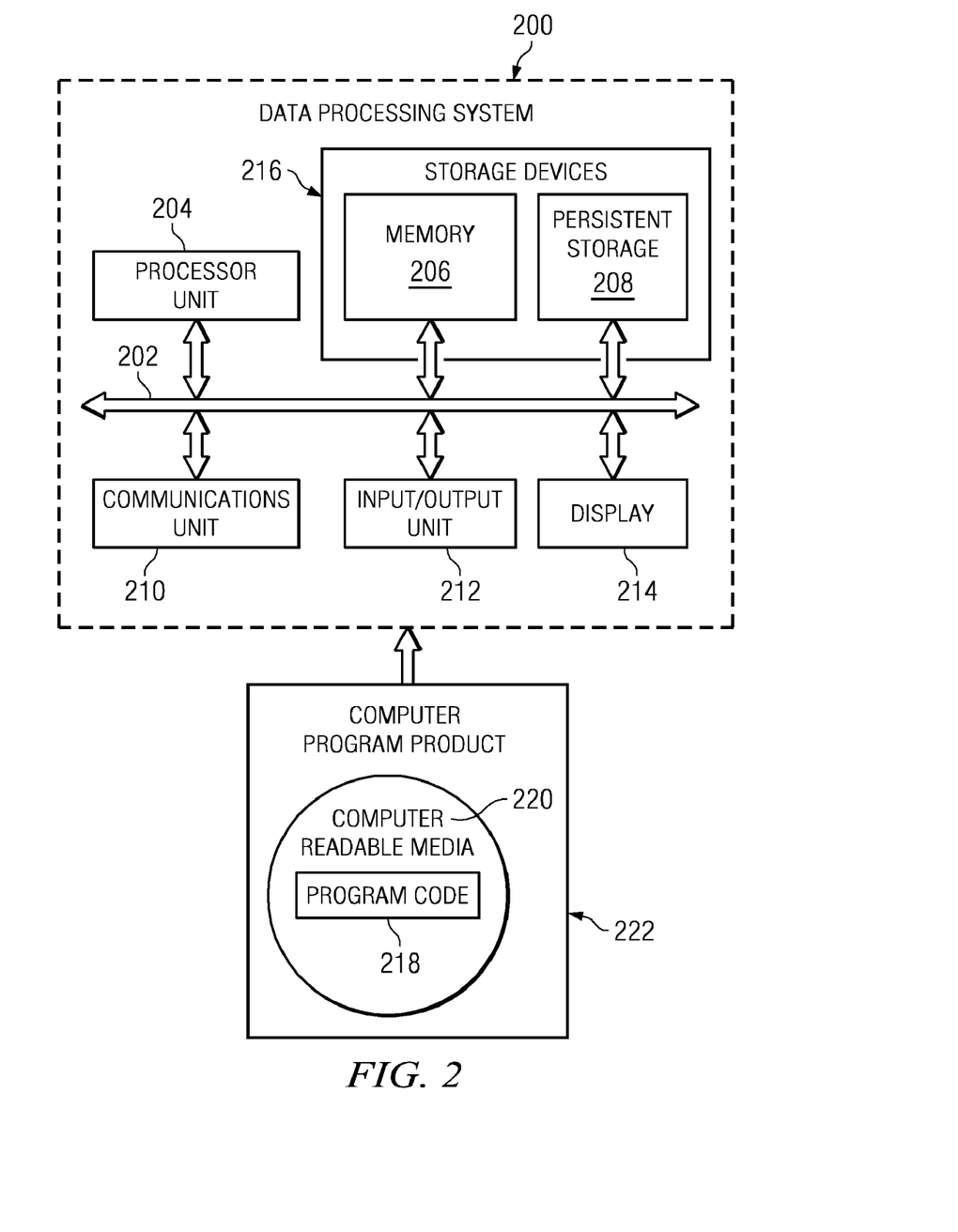
FIG. 2 is a block diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides information, such as boot files, operating system images, and applications to clients 110, 112, and 114. Clients 110, 112, and 114 are clients to server 104 in this example. Network data processing system 100 may include additional servers, clients, and other devices not shown.

Program code located in network data processing system 100 may be stored on a computer recordable storage medium and downloaded to a data processing system or other device for use. For example, program code may be stored on a computer recordable storage medium on server 104 and downloaded to client 110 over network 102 for use on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multiprocessor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instruction are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 220 is also referred to as computer recordable storage media. In some instances, computer readable media 220 may not be removable.

Alternatively, program code 218 may be transferred to data processing system 200 from computer readable media 220 through a communications link to communications unit 210 and/or through a connection to input/output unit 212. The communications link and/or the connection may be physical or wireless in the illustrative examples.

In some illustrative embodiments, program code 218 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208 and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

In existing data integration environments, solution architects may examine a variety of data integration and decision factors to determine the most appropriate data integration architecture to implement in an enterprise system. These decision factors may include facts and non-functional requirements. Conformance to some set of requirements defines the success of the data integration architecture. Facts define the internal workings, behavior, or functionality of the resources in the enterprise. Facts may describe the current conditions of the system, e.g., the size of the database, operating systems, CPU utilization, etc. A non-functional requirement defines the constraints on the design or implementation of the resources and the capabilities that a data integration architecture must provide. Examples of non-functional requirements include performance, security, scalability, or quality standards, among others. Functional requirements may be used to provide context for architectural decisions. Examples of functional requirements include use cases, product features, and business process models. Thus, for a functional requirement comprising a use case that describes the need of integrating customer data, decision factors comprising facts and non-functional requirements are used to determine the best option to integrate the customer data for the use case. In this manner, based on the data integration and decision factors applicable to a particular enterprise environment, the solution architects may then make a determination which is the most appropriate data integration architecture to use for integrating information across the enterprise system.

Consider an example in which a large manufacturing company wants to integrate the data in their customer data processing system and in their sales data processing system. The company wants to enable sales data to be accessed from the customer system to create a better customer support experience. To integrate the data in an efficient and economic manner, solution architects at the company need to determine which data integration architecture is most suitable for the integration project. Existing methodologies require the solution architects conduct numerous meetings to identify the system requirements and reach agreements among information technology personnel. In an optimal situation, the solution team contains experienced solution architects who have expertise in every area of the data integration space to examine the systems' data, perform architectural decision trade-offs (i.e., determine which facts and non-functional requirements of one system are more important than the requirements in the other system), identify the most appropriate data integration architecture to apply in the integration process based on the trade-off decisions, and present a recommendation of the identified data integration architecture to the company's architecture board. However, existing methodologies comprise many manual iterations and human interactions, which can make the decision process non-repeatable and unreliable. More importantly, the whole decision process heavily depends on a few highly experienced architects with strong data integration knowledge and experience. When these architects leave the organization or move positions, such knowledge and experience are lost. Thus, what is needed is a mechanism which eliminates many of the manual decision-making steps, offers knowledge management, speeds up the solution design, and offers consistency and reliability in recommending a data integration architecture solution.

The illustrative embodiments provide a solution to the problems in the existing art by providing a data integration decision support tool for facilitating the semi-automatic evaluation and prioritization of architectural alternatives in the data integration domain. The data integration decision support tool captures complete domain knowledge in data integration pattern selection space and uses this knowledge to analyze and recommend data integration architectures to solution architects. The data integration decision support tool enables solution architects to perform consistent and reproducible evaluations of data integration architecture pattern options.

The data integration decision support tool uses several interrelated domain-specific scoring processes to determine the most appropriate data integration architecture pattern from a set of pattern options. The domain-specific scoring processes are used in the illustrative embodiments to evaluate and compare architecture alternatives over multiple stages to incrementally and iteratively increase the confidence about the scores and the resulting information integration design. The domain-specific scoring processes may include a default score process, an information gathering and priority score process, a weighting process, and a consolidated score process. In the default score process, the data integration decision support tool automatically assigns a default score to each decision factor based on historical data integration knowledge. A default score is a numeric value representing a priority of a decision factor in relation to other decision factors. A decision factor comprises non-functional requirements and facts of the system. Examples of decision factors include, but are not limited to, Performance-Response Time, Data Latency, Size Of Data Volume Per Request, Impact Of Workload To Sources, Data Quality-Transformation, among others. The decision factors, along with their previous default scores, rules, and rationales, are stored in a data integration knowledge system, a.k.a. knowledgebase. The data integration decision support tool assigns the default scores to the decision factor options based on information stored in a metadata repository. The information in the metadata repository may include, but is not limited to, historical data integration information, including input obtained from Subject Matter Experts (SMEs) in the enterprise about the non-functional requirements (NFRs) and facts of the system. Default scores related to non-functional requirements may be obtained directly through the subject matter experts inputs through the format of detailed questions and selectable decision factor answer options that define the parameters in which the system is required to operate. Default scores related to facts may be calculated by the data integration decision support tool using the metadata repository information.

In the default score process, the data integration decision support tool gathers facts of the to-be-integrated systems and non-functional requirements and stores the gathered information in a metadata repository. The gathered information may include metadata related to physical and virtual data sources (e.g., relational databases (DB) statistics, CPU utilization, transaction response time, etc.). The metadata repository may be a subcomponent of the knowledge system, or a stand-alone system. The data integration decision support tool is then updated with the gathered metadata information, either through a "push" or "pull" process from the metadata repository to the data integration decision support tool. A "push" process means the metadata repository sends metadata to the tool, while a "pull" process means the tool initiates the receiving of the metadata input. To compliment the system requirements and conditions of metadata gathered from virtual and physical data sources, the information gathered by the data integration decision support tool includes additional system requirements and conditions input from subject matter experts in the enterprise. The data integration decision support tool then correlates the gathered information to the decision factors. For instance, input about CPU utilization and workload of the current systems may be correlated to a decision factor "Impact Of Workload To Sources". Likewise, data cleansing input from a data quality program may be correlated to a decision factor "Data Quality-Transformation". Once the data integration decision support tool correlates the gathered input to the decision factors, the tool automatically assigns a default score to the decision factors. For instance, for the Data Latency decision factor, the decision factor options may include various response time parameters, such as "more than 2 minutes", "average 10-15 seconds, maximum 2 minutes", and "average 2-5 minutes, maximum 10 seconds". Each of the options may correspond to a default score, e.g., 1, 5, or 10.

A priority score indicates the priority of a decision factor in relation to the other decision factors based on common knowledge in the Information Technology (IT) industry (stored in knowledgebase) and the relevant default scores calculated in the default score process step. In the information gathering and priority score process, the data integration decision support tool may first assign priority scores to the decision factor options based on existing knowledge (e.g., common knowledge in IT industry). For example, the priority score of a Performance-Response Time decision factor may be a low score in relation to other decision factors for an architecture pattern when the system metadata inputs indicate that the average time for a business transaction for an architecture pattern is tolerated to 30 minutes. In another example, a Data Latency decision factor may be used to indicate the "freshness" of the data provided by the system. For the Data Latency decision factor, the candidate data federation architecture pattern may be given a higher priority score than the other two candidate architecture patterns because data federation uses synchronous, real-time access from consumer to integrated sources and back, whereas the other two patterns typically do not return the latest data. In addition, the subject matter experts in the enterprise may provide inputs and fine-tune/adjust the priority scores for a candidate architecture pattern. The subject matter experts may fine-tune the existing priority scores on an ongoing basis. Consequently, the priority scores may be dynamically adjusted based on the inputs provided for each decision factor in the information gathering process. Thus, while the default score process assigns the default scores to decision factor options primarily based on historical knowledge/iterations of the data integration process, the priority scores are assigned to the decision factors and adjusted based on current input and/or answers collected from subject matter experts in the enterprise and live system metadata comprising current (up-to-date) IT system information.

In the weighting process, the data integration decision support tool automatically assigns weighting scores to each decision factor. The purpose of the weighting process is to show the priority of the decision factors in an overall picture, thereby enabling one to clearly visualize which decision factors for each candidate architecture pattern have a higher priority over other factors. The weighting scores are assigned based on the default score assigned to each decision factor. In one embodiment, the weighting scores may be calculated by dividing each default score by the sum of the priority scores for all decision factors. For example, if the overall default score for all decision factors is 48, and the "Data Latency" decision factor has a default score of 10, the weighting score for "Data Latency" is calculated as 10 divided by 48, which is 0.2083, or 20.83%.

In the consolidated score process, the data integration decision support tool automatically calculates a consolidated, final score for each data integration architecture using the priority scores calculated in the information gathering process and the weighting percentages calculated in the weighting process. The consolidated scores for each data integration architecture may then be used by the solution architect to select a particular data integration architecture to recommend for the data integration process.

The data integration decision support tool provided in the illustrative embodiments provides several advantages over existing data integration methodologies. With the solution in the illustrative embodiments, domain knowledge and metadata for existing systems may be collected automatically from physical and virtual data sources in the enterprise and used as input and integrated into the data integration architecture decision making process. Thus, the automatic inputs may be complimented with the system requirements and conditions inputs from subject matter experts in the enterprise system. The illustrative embodiments may also enhance the skill set of solution architects that need to make decisions based on the gathered and continuously refined domain expertise, as the data integration decision support tool captures complete domain knowledge in data integration pattern selection space. In addition, knowledge gathered from the multiple domains becomes visible during the evaluation process and may be made available to the solution architect as an education vehicle. Furthermore, data integration architecture scoring as disclosed in the illustrative embodiments provides a more objective justification for data integration architecture decisions, thereby reducing project risk and development and test efforts.

Figure 3:
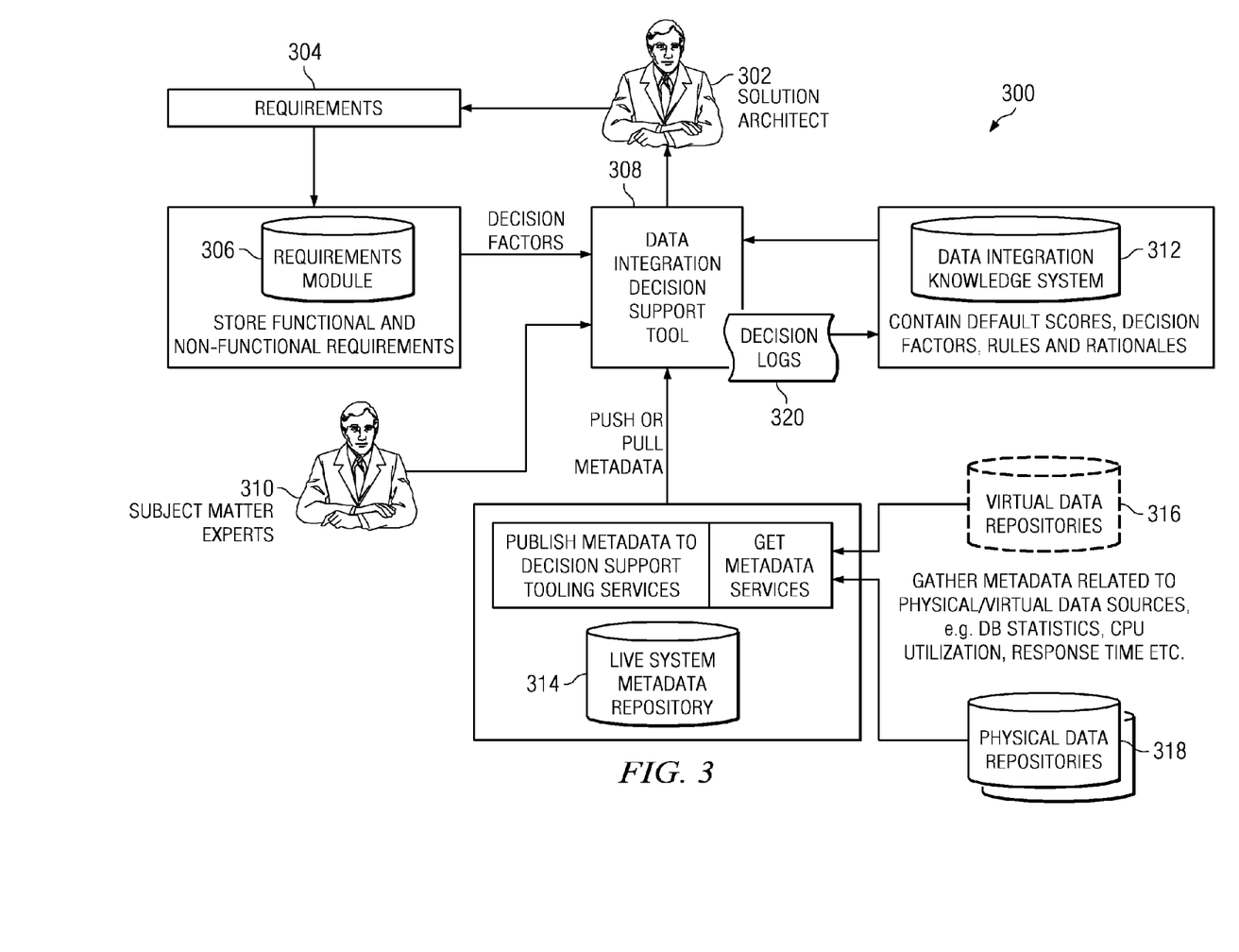
FIG. 3 is a block diagram of a data processing system for evaluating and prioritizing architectural alternatives for integrating data in accordance with the illustrative embodiments.

FIG. 3 is a block diagram of a data processing system for semi-automatically evaluating and prioritizing architectural alternatives for integrating data in accordance with the illustrative embodiments. Data integration design system 300 may be implemented in a network of data processing systems, such as network data processing system 100 in FIG. 1. Alternatively, data integration design system 300 may be implemented in a single data processing system, such as data processing system 200 in FIG. 2.

Data integration design system 300 is a data processing system that includes a plurality of software components or modules that data integration design system 300 uses to create an optimized decision making process for determining appropriate architecture patterns for a data integration project. However, it should be noted that data integration design system 300 is only meant as an example and not intended as a limitation on different illustrative embodiments. In other words, data integration design system 300 may include more or fewer components as necessary to accomplish processes of the different illustrative embodiments.

In data integration design system 300, a solution architect 302 may input facts and non-functional requirements 304 for integrating data into a requirements module 306. A data integration decision making support tool, herein referred to as data integration decision support tool 308, receives input from various sources, including requirements module 306, subject matter experts 310, data integration knowledge system 312, and live system metadata repository 314. Data integration decision support tool 308 evaluates the input and provides a recommendation of data integration architecture patterns to solution architect 302.

Requirements module 306 may include a software application designed to capture and store architecture or design requirements, such as functional and non-functional requirements 304, for one or more architecture patterns. Functional requirements are behavioral requirements, which specify the actions that a system must be able to perform, e.g., use cases. Non-functional requirements define the desired quality to the end user or constraints that must be satisfied by the data integration architecture pattern. These desired qualities typically include performance, fault-tolerance, availability, scalability, and security constraints, etc. Facts describe the current conditions of the system, e.g., the size of the database, operating systems, CPU utilization, etc. Functional and non-functional requirements 304 as specified by solution architect 302 may be stored in or by requirements module 306.

Requirements module 306 may, for example, be a commercially available system, such as Rational® Requisite Pro®, a product available from the IBM® Corporation, or a home-grown system. Rational® Requisite Pro® is a requirements management tool that organizes and documents project requirements so that an enterprise can manage software application design change and provides for collaborative development of software application design. Data integration decision support tool pulls facts and non-functional requirements from requirements module 306 and standardizes/transforms them as candidates for decision factors. The requirements models may be obtained from flat files, wiki files, or spreadsheets stored in requirements module 306. There is a direct correlation between the non-functional requirements in requirements models and the decision factors, which are used to determine the suitability of particular data integration architectures to apply to the current source databases needing to be integrated.

Data integration decision support tool 308 may be implemented using an existing software application or programming language. In one embodiment, data integration decision support tool 308 may be implemented using a web-based user interface. In other embodiments, data integration decision support tool may be implemented using Java, C or Eclipse based platform. Data integration decision support tool 308 collects inputs from requirements module 306, subject matter experts 310, data integration knowledge system 312 and live system metadata repository 314 and then uses the functionality in the software application or programming language to evaluate and weigh these inputs to recommend suitable data integration architecture patterns to solution architect 302 for the data integration.

In order to generate the list of recommended data integration architecture patterns, data integration decision support tool 308 queries and obtain answers to questions in the decision factors from subject matter experts 310 and live system metadata repository 314. Subject matter experts 310 comprise individuals or groups in various roles in the enterprise system, and these individuals or groups may have subject matter expertise across various domains in the enterprise. Data integration decision support tool 308 may identify subject matter experts based on the expertise and/or credentials of the individuals or groups. The expertise/credentials information may be derived from an organization's lightweight directory access protocol (LDAP), expertise system, or knowledge systems. Contact information in the LDAP, expertise system, and knowledge system may also be used by data integration decision support tool 308 to assist in routing decision factors to the appropriate subject matter experts. Data integration decision support tool 308 queries subject matter experts 310 using the decision factors defined by the facts and non-functional requirements in the requirements model, and subject matter experts 310 provide answers to the queries to data integration decision support tool 308.

Live system metadata repository 314 comprises current IT system information and may be collected by data integration decision support tool 308 from virtual data repositories 316 and physical data repositories 318. The metadata repository may be a subcomponent of data integration knowledge system 312, or a stand-alone system. Virtual data repositories 316 are data stores configured to contain system metadata related to virtual data sources. The system metadata in virtual data repositories 316 may encompass a variety of system performance information, including, but not limited to, database access statistics, response times, CPU utilization, and the like. Physical data repositories 318 are data stores configured to contain system metadata related to the physical data sources. The system metadata in physical data repositories 318 may also encompass a variety of system performance information, including, but not limited to, database access statistics, response times, CPU utilization, and the like. The system metadata in virtual data repositories 316 and physical data repositories 318 is provided to metadata repository, wherein the system metadata is published to data integration decision support tool 308. Data integration decision support tool 308 queries virtual data repositories 316 and physical data repositories 318 using the decision factors. The live system metadata gathered from virtual data repositories 316 and physical data repositories 318 based on the decision factors is used by data integration decision support tool 308 to provide answers (system metadata) to the decision factors defined by the facts and non-functional requirements in the requirements model.

Data integration decision support tool 308 may include a user interface and decision logs 320. Data integration decision support tool 308 may be implemented as a plug-in component that utilizes communication standards that support cross-platform interoperability and/or as a lightweight Web application. For example, data integration decision support tool 308 may be written as an ECLIPSE environment plug-in that utilizes an extensible markup language (XML) schema, which can then interface with other software applications that utilize the ECLIPSE environment as well as applications that support XML transactions.

The user interface may be the means by which data integration decision support tool 308 interacts with solution architect 302 and subject matter experts 310. The user interface may display the recommended suitable data integration architecture patterns to solution architect 302 as well as receive input from solution architect 302 and subject matter experts 310.

Decision logs 320 may be the means by which data integration decision support tool 308 may automatically document architectural design decisions from solution architect 302 for subsequent re-use. Decision logs 320 may also include decision factors pertaining to the facts and non-functional requirements 304 being addressed and answers provided to the decision factors based on the inputs from subject matter experts 310 and the metadata from live system metadata repository 314. Data integration knowledge system 312 may mine and use the information in decision logs 320 for future iterations of the data integration decision process.

Data stores, including virtual data repositories 316 and physical data repositories 318, may be physical or virtual storage spaces configured to store digital information. The data stores may be physically implemented within any type of hardware including, but not limited to, a magnetic disk, an optical disk, a semiconductor memory, a digitally encoded plastic memory, a holographic memory, or any other recording medium. The data stores may be a stand-alone storage unit as well as a storage unit formed from a plurality of physical devices. Additionally, information may be stored within the data stores in a variety of manners. For example, information can be stored within a database structure or can be stored within one or more files of a file storage system, where each file may or may not be indexed for information searching purposes. Further, the data stores may utilize one or more encryption mechanisms to protect stored information from unauthorized access.

Data integration decision support tool 308 extracts particular facts and non-functional requirements from requirements module 306 based on the metadata in requirements model 306. The tool then standardizes/transforms these facts and non-functional requirements as candidates to be decision factors. Previous decision factors, default scores, rules, and rationales may also be extracted from data integration knowledge system 312. Data integration decision support tool 308 correlates the input provided by subject matter experts 310 and the metadata from live system metadata repository 314 to certain decision factors obtained from requirements module 306 or data integration knowledge system 312.

Solution architect 302 in FIG. 3 may accept, modify or reject candidate non-functional decision factors if necessary. The questions in the decision factors may be answered by the solution architects or by other personnel or roles with expertise in a particular domain. The answers to the decision factors allow the solution architects to determine the feasibility of implementing each of the data integration architecture pattern solutions in the data integration project.

Figure 4:
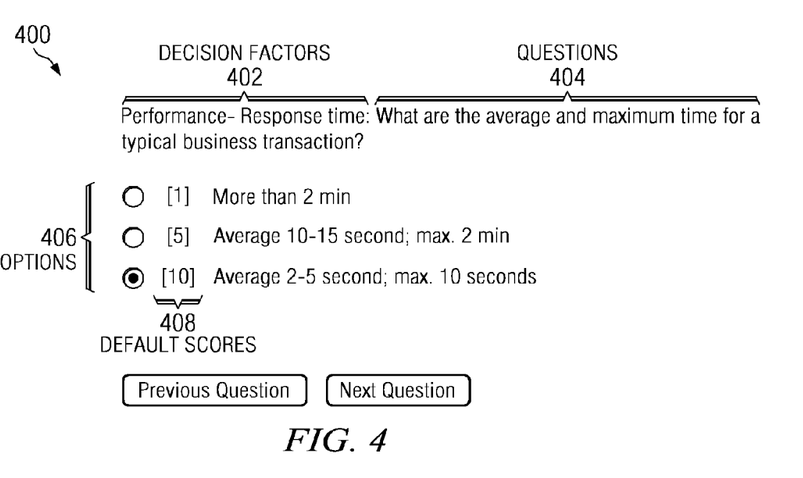
FIG. 4 illustrates exemplary decision factors derived in accordance with the illustrative embodiments.

FIG. 4 illustrates exemplary decision factors derived in accordance with the illustrative embodiments. The solution architect 302 in FIG. 3 derives the functional and non-functional decision factors from the requirements stored in the requirements module 306. In this illustrative example, user interface 400 comprises decision factors 402 that contain detailed questions 404 and selectable decision factor answer options 406. Each decision factor answer option is represented by a corresponding answer default score 408 that is derived by the data integration decision support tool. For example, a performance-response time decision factor that queries the average and maximum response times of a transaction may comprise an answer option of 2 millisecond which represents a default priority score of '10', an answer option of 1 second represents a default priority score of '8', and an answer option of 1 minute represents a default priority score of '1'. Default scores 408 may be derived from previous score values stored in decision logs 328 in FIG. 3 for a particular decision factor option. The data integration decision support tool may also assign the default scores based on industry best practices and common acceptance by practitioners. These default priority scores may be stored in the data integration knowledge base.

Figure 5:
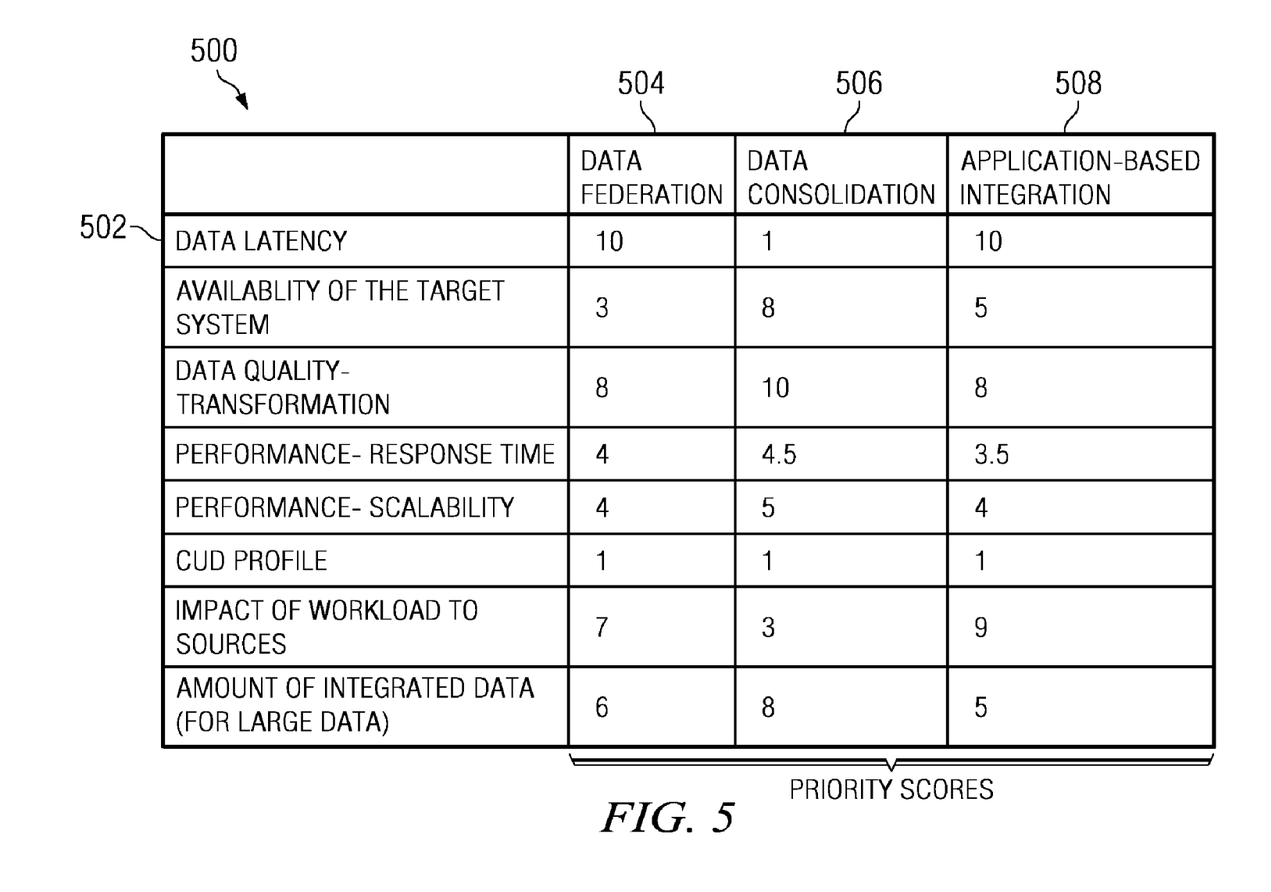
FIG. 5 illustrates exemplary priority scores for the decision factors from the knowledgebase in accordance with the illustrative embodiments.

FIG. 5 illustrates exemplary information gathered based on the decision factors and assigned priority scores in accordance with the illustrative embodiments. FIG. 5 may be implemented as a decision table, which is used internally by the data integration decision support tool. The user interface for the decision table may be different based on the particular implementation.

The data integration decision support tool queries and collects information comprising answers to the decision factors (such as the selection of a particular answer option for performance-response time decision factor in FIG. 4) derived by the solution architects from various subject matter experts in the organization. The decision factors are routed to the appropriate subject matter experts in the organization based on information provided by the LDAP, expertise system, or knowledge system of the organization. When answers to the decision factors are received from the subject matter experts, the data integration decision support tool assigns a priority score to each decision factor.

Data Latency decision factor 502 is one example factor in decision table 500. The data integration decision support tool submits the decision factor questions (e.g., the questions in user interface 400 in FIG. 4) to subject matter experts in the organization, and the subject matter experts provide answers to the question. The subject matter experts provide answers applicable to each data integration pattern-data federation pattern 504, data consolidation pattern 506, and application-based integration pattern 508. Each entry in Data Latency decision factor 502 for a particular architecture pattern comprises an answer (not shown) to the decision factor, and a priority score is automatically assigned to each entry. For the standard data federation pattern 504 in this example, the data integration decision support tool assigns a priority score of 10 to Data Latency decision factor 502. For the data consolidation pattern 506, the data integration decision support tool assigns a priority score of 1 to Data Latency decision factor 502. For the application-based integration pattern 508, the data integration decision support tool assigns a priority score of 10 to Data Latency decision factor 502.

In situations where a decision factor has dependencies on another decision factor, the data integration decision support tool may also adjust the priority score values based on these dependencies. Thus, the priority scores are not static and may change depending on other factors, such as due to dependencies on other decision factors. The data integration decision support tool makes architecture decision trade-offs and adjusts the priority scores for the decision factors. For example, the priority score for the Performance-Response Time decision factor for the different architecture patterns may be adjusted due to dependency on another decision factor, such as a Size Of Data Volume Per Request decision factor. The following formula is an example of how the priority scores for Performance-Response Time decision factor for an architecture pattern may be adjusted:

IF (the size of data volume per request >1,
IF (the size of data volume per request =10, 2, 5), 8).

The following decision table illustrates the same formula above:

|  | Size Of Data Volume Per Request | | |
| --- | --- | --- | --- |
|  | Large (score of 10) | Medium (score of 5) | Small (score of 1) |
| Performance of Data Federation | 2 | 5 | 8 |
| Performance of Data Consolidation | 5 | 7 | 9 |
| Performance of Application-based Integration | 1 | 2 | 7 |

The data integration decision support tool checks the priority scores of the Size Of Data Volume Per Request decision factor. The formula and table specify that if the priority score assigned to the Size Of Data Volume Per Request decision factor indicates that the size of the data volume per request is 'large', the priority score assigned to the Performance-Response Time decision factor is adjusted to a new priority score of 2. If the priority score assigned to the Size Of Data Volume Per Request decision factor indicates that the size of the data volume per request is 'medium', the priority score assigned to the Performance-Response Time decision factor is adjusted to a new priority score of 5. If the priority score assigned to the Size Of Data Volume Per Request decision factor indicates that the size of the data volume per request is 'small', the priority score assigned to the Performance-Response Time decision factor is adjusted to a new priority score of 8. This formula may be applied to each architecture pattern using appropriate adjusted scores for the particular pattern.

In this example, a value of '10' reflects a highest priority score, and a value of '1' reflects a lowest priority score. It should be noted that the values may be scaled, as the relative score values are more important than the numbers assign to them. For example, the highest priority score may be '100' and the lowest priority score may be '10'.

Figure 6:
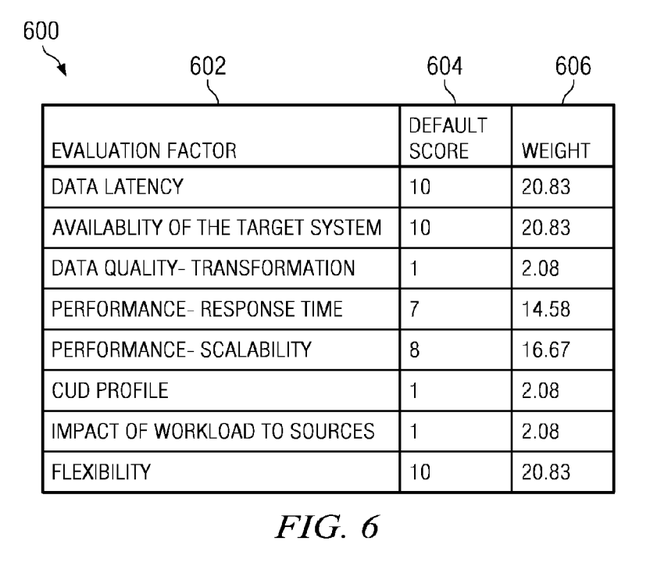
FIG. 6 illustrates exemplary weighting scores calculated for the decision factor based on default scores in accordance with the illustrative embodiments.

FIG. 6 illustrates exemplary weighting scores calculated for the decision factor priority scores in accordance with the illustrative embodiments. Weighting scores may be presented to the user in various user interface formats, such as in a table, chart, diagram, etc. In this illustrative example, weighting table 600 is shown to comprise decision factors 602, priority scores 604, weighting percentages 606. The data integration decision support tool automatically populates weighting table 600 with the decision factors derived by the solution architects. The data integration decision support tool also populates weighting table 600 with the default scores associated with each decision factor, such as the default scores derived in FIG. 4. For example, the data integration decision support tool populates weighting table 600 with Data Latency decision factor and its associated default score of 10. Once all of the decision factors and associated default scores are inserted into weighting table 600, the data integration decision support tool automatically calculates a weighting percentage for each decision factor. The weighting percentage may be calculated by dividing the default score by the sum of the default scores for all of the decision factors. In this example illustration, the sum of all decision factors is 48. Thus, the weighting percentage for the Data Latency decision factor is (10÷48)=0.2083, or 20.83%.

Figure 7:
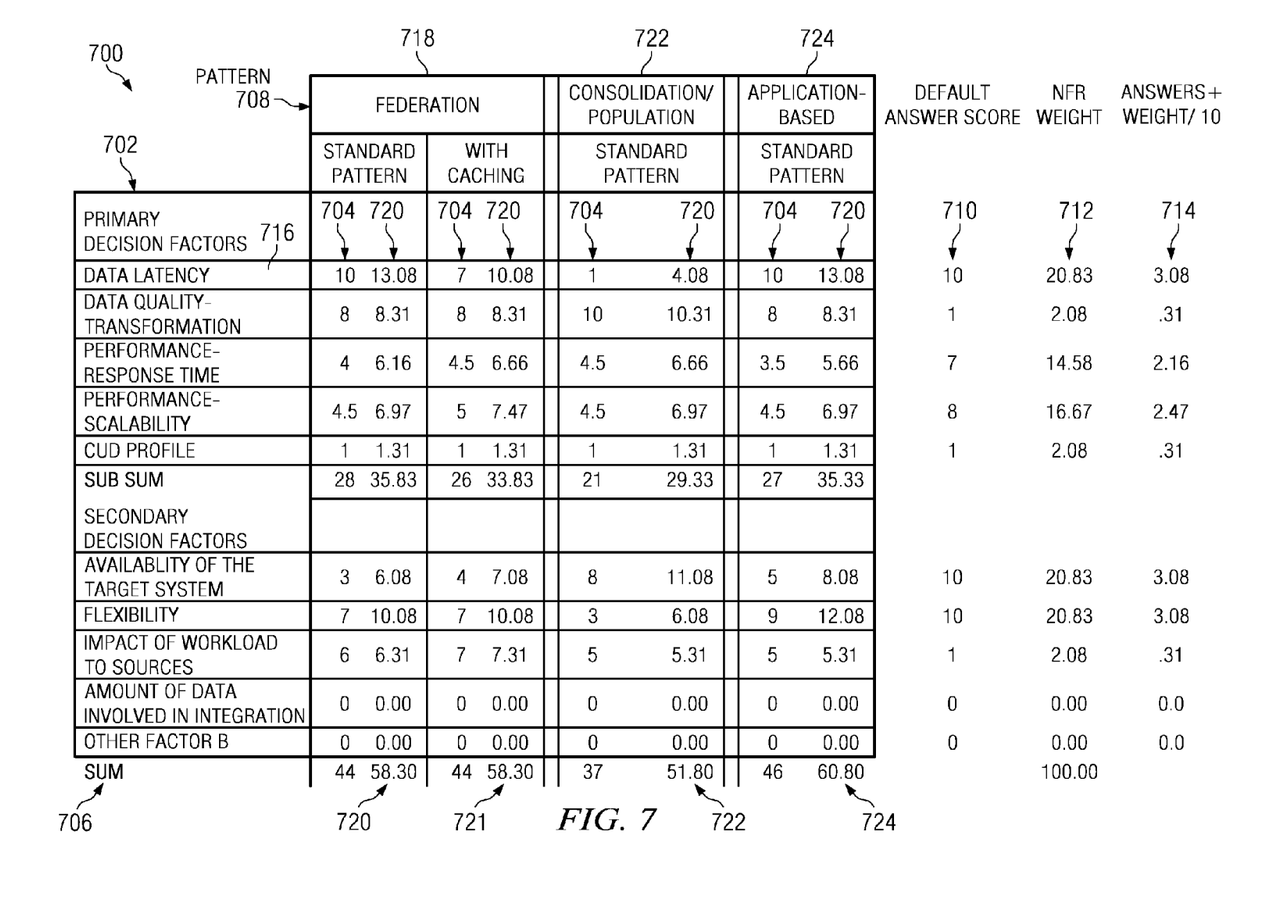
FIG. 7 illustrates exemplary consolidation scores calculated for the data integration architecture patterns in accordance with the illustrative embodiments.

FIG. 7 illustrates exemplary consolidation scores calculated for the architecture patterns in accordance with the illustrative embodiments. Consolidation score table 700 is shown to comprise decision factors 702, priority scores 704 for each decision factor, and a total consolidated score 706 for each architecture pattern 708. A consolidated score is a value that reflects the weighted answers to a decision factor, wherein the answers are weighted based on the assigned priority levels (default score and priority score) of the decision factor in relation to other evaluation criteria. The data integration decision support tool automatically calculates a dynamic consolidated score for each architecture pattern based on the priority scores calculated from the information gathering process and the weighting scores calculated from the default scores by the weighting process.

To calculate a consolidated score for each of the individual decision factors, the data integration decision support tool first adds the default score 710 for the decision factor to the weighted score 712 calculated by the weighting process and as shown in FIG. 6 and divides the sum by 10 to generate a weighting factor 714. For instance, for Data Latency decision factor 716, the weighting factor calculated using a default score of 10 and a weighted percentage score of 20.83 for the particular decision factor is 3.08.

The data integration decision support tool then adds the priority score 704 of the decision factor to the weighting factor 714 calculated for the decision factor. For example, the Data Latency decision factor 716 for the standard data federation pattern 718 comprises a priority score of 10, and this score is added to the calculated weighting factor of 3.08, for an individual consolidated score of 13.08 720. Similarly, the Data Latency decision factor 716 for the data consolidation pattern 722 comprises a priority score of 1 that is added to the decision factor's weighting factor of 3.08, for a consolidated score of 4.08. The consolidated score for application-based integration pattern 724 is also 13.08. Consolidated scores are calculated for all of the decision factors and for each architecture pattern.

Once all of the consolidated scores for each decision factor are determined, the data integration decision support tool may calculate the total consolidated score for a set of decision factors by summing the individual consolidated scores. The set of decision factors may comprise a group of decision factors (e.g., primary factors, secondary factors), all of the decision factors for the architecture pattern, or a combination of both. In this example, the total consolidated scores are shown to be 58.30 for the standard data federation pattern 720, 58.30 for the data federation with caching pattern 721, 51.80 for data consolidation pattern 722, and 60.80 for application-based integration pattern 724. The solution architects may use these consolidation scores to assist in determining which architecture pattern is best suited to the system for performing the data integration project. This example illustrates that the application-based integration pattern 724 comprises the highest score, while data consolidation pattern 722 comprises the lowest score. Based on the consolidation scores, a solution architect may determine that either application-based integration pattern 724 or data federation pattern 720 may be acceptable for performing the data integration project. As the score for data consolidation pattern 722 is much lower than the others, data consolidation pattern 722 may be eliminated from consideration by the solution architect as a candidate pattern for the data integration.

Figure 8:
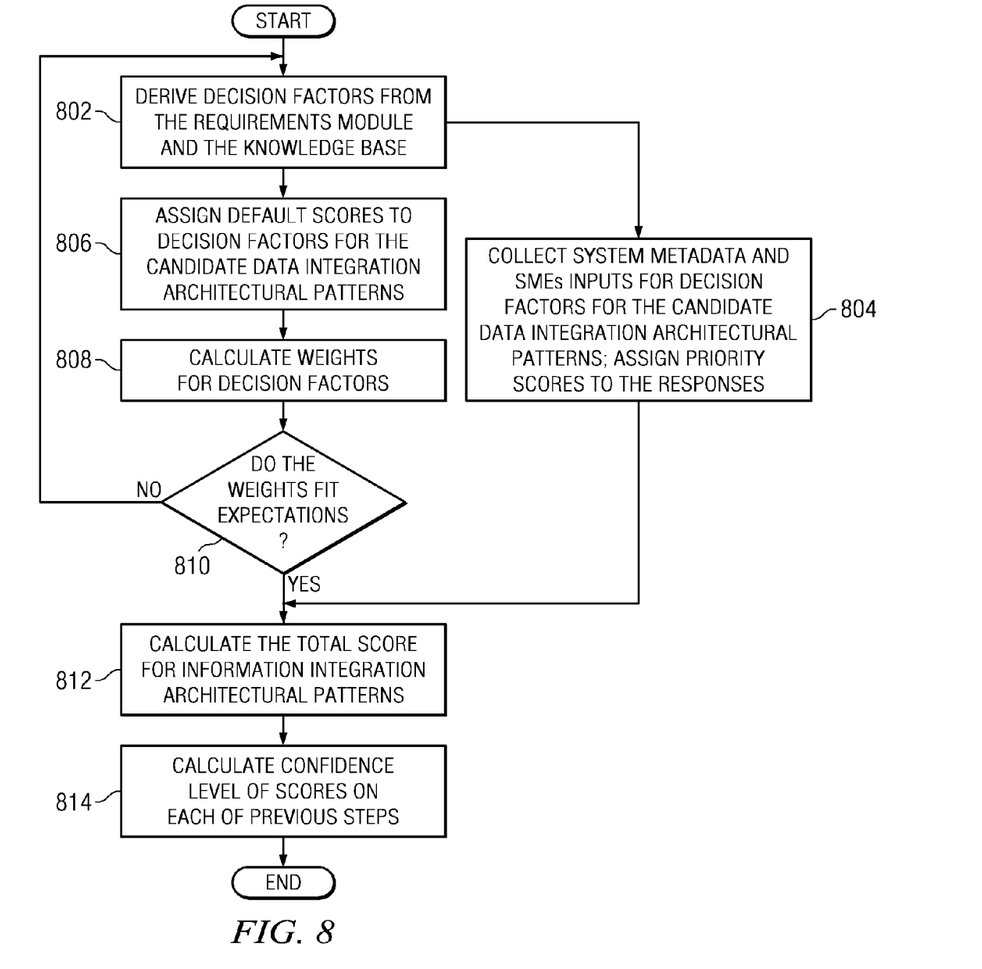
FIG. 8 is a high level work flow of a process for evaluating and prioritizing architectural alternatives for integrating data in accordance with the illustrative embodiments.

FIG. 8 is a high level work flow of a process for evaluating and prioritizing architectural alternatives for integrating data in accordance with the illustrative embodiments. The process described in FIG. 8 may be implemented by data integration decision support tool 308 in FIG. 3.

The process begins with the data integration decision support tool deriving decision factors from the facts and non-functional requirements stored in the requirements module 306 and previous decision factors stored in the knowledgebase (data integration knowledge system 312) in FIG. 3 (step 802). The data integration decision support tool then collects system metadata and input from subject matter experts based on answers to a certain set of decision factors and assigns priority scores to the responses for all of the candidate architecture patterns (step 804). These priority scores may change and be fine-tuned based on decision factor answers collected on an ongoing basis from the input from the subject matter experts.

In a parallel process, the data integration decision support tool also automatically assigns a set of default scores to the decision factors for all of the candidate architecture patterns (step 806). The default scores for the decision factors are pre-determined and may be based on past experiences and best practices. The data integration decision support tool then calculates a weight for each factor in the set of decision factors (step 808). The weights may be calculated using the default scores assigned to the decision factors and dividing the default scores by the sum of the default scores for all of the factors.

Solution architects then determine whether the calculated weights meet the architects' expectations of how the scores should be weighted (step 810). In other words, the calculated weights are evaluated by the solution architects to determine if the weights are more or less is aligned with the solution architects' expectations. The purpose of this step is to ensure quality control performed by experienced SMEs. If the calculated weights do not meet the expectations, the process loops back to recollect the system metadata and subject matter expert input and assign default scores for the architecture patterns. Thus, if the solution architects' expectations and the calculated weights are far apart, the solution architects may analyze the details of each default score and determine if any of the collected information needs to be updated and amended.

However, if the calculated weights meet expectations, the data integration decision support tool calculates a total consolidated score for each architectural pattern candidate (step 812). The total consolidated scores may be calculated using the priority scores calculated in step 804 and the weighting percentages calculated in step 808. The total consolidated scores are dynamic based on answers provided to each decision factor question. The data integration decision support tool may also calculate confidence levels for the calculated weights for each decision factor and the total scores for each architectural pattern (step 814). In general, the more inputs gathered from the knowledgebase, metadata repository, and subject matter experts, the higher confidence levels the data integration decision support tool will automatically assign to the total scores. Solution architects may also assign a confidence level for each set of consolidated scores. The data integration decision support tool will produce a final confidence score by combining the inputs and the solution architects' confidence level assessments. The consolidated scores (and the confidence levels) for each data integration architecture pattern candidate may then be used by the solution architect to select a particular data integration architecture to recommend for the data integration process.

The flowchart and block diagrams in the Figures illustrate the architecture, functionality, and operation of possible implementations of systems, methods and computer program products according to various embodiments of the disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments of the disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The disclosure can take the form of an entirely hardware embodiment, an entirely software embodiment or an embodiment containing both hardware and software elements. In a preferred embodiment, the disclosure is implemented in software, which includes but is not limited to firmware, resident software, microcode, etc.

Furthermore, the embodiments of the disclosure can take the form of a computer program product accessible from a computer-usable or computer-readable data storage medium providing program code for use by or in connection with a computer or any instruction execution system. For the purposes of this description, a computer-usable or computer readable data storage medium can be any tangible apparatus that can store the program for use by or in connection with the instruction execution system, apparatus, or device.

The computer-readable data storage medium can be an electronic, magnetic, optical, or semiconductor system (or apparatus or device). Examples of a computer-readable data storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the embodiments of the disclosure has been presented for purposes of illustration and description, and is not intended to be exhaustive or limited to the embodiments in the form disclosed. Many modifications and variations will be apparent to those of ordinary skill in the art. The embodiment was chosen and described in order to best explain the principles of the disclosure, the practical application, and to enable others of ordinary skill in the art to understand the disclosure for various embodiments with various modifications as are suited to the particular use contemplated.

What is claimed is:

1. A method for evaluating architectural design patterns for data integration in an enterprise system, the method comprising the steps of:
    deriving, by a computer, a set of decision factors from a set of requirements for a system to be integrated, wherein the set of requirements specify capabilities that an architecture design pattern is required to provide;
    assigning, by the computer, a default score to each decision factor in the set of decision factors based on historical data integration knowledge;
    calculating, by the computer, a weighted score for each decision factor using the default scores to indicate a priority of a decision factor in relation to other decision factors;
    assigning, by the computer, a priority score to each decision factor based on inputs obtained from system metadata related to the decision factors from virtual and physical data sources, experts in the enterprise system, and expert data related to the decision factors from subject matter experts in the enterprise system;
    calculating, by the computer, an individual consolidated score using the default score, weighted score, and the priority score of each decision factor;
    calculating, by the computer, a total consolidated score from the individual consolidated scores for the architecture design pattern; and
    comparing, by the computer, the total consolidated score for the architecture design pattern against total consolidated scores for other architecture design patterns to determine a suitable candidate architecture design pattern for data integration.

2. The method of claim 1, further comprising the step of:
    calculating, by the computer, a confidence level of at least one of the default scores, the weighted scores, the priority scores, the individual consolidated score, and the total consolidated score to indicate accuracy of the historical data integration knowledge and the inputs.

3. The method of claim 1, further comprising the step of: receiving, by the computer, additional expert data related to the decision factors from the subject matter experts, wherein the additional expert data is used to fine-tune the priority scores.

4. The method of claim 1, wherein the set of requirements include facts defining at least one of operation, behavior, and functionality of resources in the enterprise system, and non-functional requirements that define constraints on design or implementation of the resources.

5. The method of claim 1, wherein the historical data integration knowledge comprises facts and non-functional requirements of the system to be integrated.

6. The method of claim 1, wherein the step of calculating, by the computer, a weighted score for each decision factor comprises:
dividing, by the computer, each default score by a sum of the default scores for the decision factors.

7. The method of claim 1, wherein the step of calculating, by the computer, an individual consolidated score comprises:
dividing, by the computer, a sum of the default score to the weighted score of a decision factor by a predetermined value to generate a weighting factor; and
adding, by the computer, the priority score of the decision factor to the weighting factor.

8. The method of claim 1, wherein the step of calculating, by the computer, a total consolidated score comprises:
calculating, by the computer, a sum of a set of individual consolidated scores for the architecture design pattern.

9. The method of claim 1, wherein the set of decision factors and associated default scores, rules, and rationales are stored in a data integration knowledge system.

10. The method of claim 1, wherein the inputs obtained from system metadata related to the decision factors from virtual and physical data sources, experts in the enterprise system, and expert data related to the decision factors from subject matter experts in the enterprise system are stored in a metadata repository.

11. The method of claim 1, further comprising the step of: responsive to selection, by the computer, of a suitable candidate architecture design pattern for the data integration, storing, by the computer, the selected suitable candidate architecture design pattern in a decision log.

12. The method of claim 1, wherein the system metadata comprises current system performance information.

13. A computer system for evaluating architectural design patterns for data integration in an enterprise system, the computer system comprising:
one or more processors, one or more computer-readable memories, and one or more computer-readable tangible storage devices;
program instructions, stored on at least one of the one or more computer-readable tangible storage devices for execution by at least one of the one or more processors via at least one of the one or more computer-readable memories, to derive a set of decision factors from a set of requirements for a system to be integrated, wherein the set of requirements specify capabilities that an architecture design pattern is required to provide;
program instructions, stored on at least one of the one or more computer-readable tangible storage devices for execution by at least one of the one or more processors via at least one of the one or more computer-readable memories, to assign a default score to each decision factor in the set of decision factors based on historical data integration knowledge;
program instructions, stored on at least one of the one or more computer-readable tangible storage devices for execution by at least one of the one or more processors via at least one of the one or more computer-readable memories, to calculate a weighted score for each decision factor using the default scores to indicate a priority of a decision factor in relation to other decision factors;
program instructions, stored on at least one of the one or more computer-readable tangible storage devices for execution by at least one of the one or more processors via at least one of the one or more computer-readable memories, to assign a priority score to each decision factor based on inputs obtained from system metadata related to the decision factors from virtual and physical data sources, experts in the enterprise system, and expert data related to the decision factors from subject matter experts in the enterprise system;
program instructions, stored on at least one of the one or more computer-readable tangible storage devices for execution by at least one of the one or more processors via at least one of the one or more computer-readable memories, to calculate an individual consolidated score using the default score, weighted score, and the priority score of each decision factor;
program instructions, stored on at least one of the one or more computer-readable tangible storage devices for execution by at least one of the one or more processors via at least one of the one or more computer-readable memories, to calculate a total consolidated score from the individual consolidated scores for the architecture design pattern; and
program instructions, stored on at least one of the one or more computer-readable tangible storage devices for execution by at least one of the one or more processors via at least one of the one or more computer-readable memories, to compare the total consolidated score for the architecture design pattern against total consolidated scores for other architecture design patterns to determine a suitable candidate architecture design pattern for data integration.

14. A computer program product for evaluating architectural design patterns for data integration in an enterprise system, the computer program product comprising:
one or more computer-readable tangible storage devices;
program instructions, stored on at least one of the one or more computer-readable tangible storage devices, to derive a set of decision factors from a set of requirements for a system to be integrated, wherein the set of requirements specify capabilities that an architecture design pattern is required to provide;
program instructions, stored on at least one of the one or more computer-readable tangible storage devices, to assign a default score to each decision factor in the set of decision factors based on historical data integration knowledge;
program instructions, stored on at least one of the one or more computer-readable tangible storage devices, to calculate a weighted score for each decision factor using the default scores to indicate a priority of a decision factor in relation to other decision factors;
program instructions, stored on at least one of the one or more computer-readable tangible storage devices, to assign a priority score to each decision factor based on inputs obtained from system metadata related to the decision factors from virtual and physical data sources, experts in the enterprise system, and expert data related to the decision factors from subject matter experts in the enterprise system;

program instructions, stored on at least one of the one or more computer-readable tangible storage devices, to calculate an individual consolidated score using the default score, weighted score, and the priority score of each decision factor;

program instructions, stored on at least one of the one or more computer-readable tangible storage devices, to calculate a total consolidated score from the individual consolidated scores for the architecture design pattern; and program instructions, stored on at least one of the one or more computer-readable tangible storage devices, to compare the total consolidated score for the architecture design pattern against total consolidated scores for other architecture design patterns to determine a suitable candidate architecture design pattern for data integration.

15. The computer program product of claim 14, further comprising:

program instructions, stored on at least one of the one or more computer-readable tangible storage devices, to calculate a confidence level of at least one of the default scores, the weighted scores, the priority scores, the individual consolidated score, and the total consolidated score to indicate accuracy of the historical data integration knowledge and the inputs.

16. The computer program product of claim 14, further comprising:

program instructions, stored on at least one of the one or more computer-readable tangible storage devices, to receive additional expert data related to the decision factors from the subject matter experts, wherein the additional expert data is for fine-tuning the priority scores.

17. The computer program product of claim 14, wherein the set of requirements include facts defining at least one of operation, behavior, and functionality of resources in the enterprise system, and non-functional requirements that define constraints on design or implementation of the resources.

18. The computer program product of claim 14, wherein the program instructions to calculate a weighted score for each decision factor divide each default score by a sum of the default scores for the decision factors.

19. The computer program product of claim 14, wherein the program instructions to calculate an individual consolidated score divide a sum of the default score to the weighted score of a decision factor by a predetermined value to generate a weighting factor and add the priority score of the decision factor to the weighting factor.

20. The computer program product of claim 14, wherein the program instructions to calculate a total consolidated score calculate a sum of a set of individual consolidated scores for the architecture design pattern.

* * * * *